(12) United States Patent
Huang et al.

(10) Patent No.: US 9,815,379 B2
(45) Date of Patent: Nov. 14, 2017

(54) SYSTEMS AND METHODS FOR ELECTRIC VEHICLE INDUCTION COIL ALIGNMENT

(71) Applicant: QUALCOMM Incorporated, San Diego, CA (US)

(72) Inventors: Chang-Yu Huang, Auckland (NZ); Nicholas Athol Keeling, Auckland (NZ); Jonathan Beaver, Auckland (NZ); Michael Le Gallais Kissin, Auckland (NZ); Mickel Bipin Budhia, Auckland (NZ)

(73) Assignee: QUALCOMM Incorporated, San Diego, CA (US)

( * ) Notice: Subject to any disclaimer, the term of this patent is extended or adjusted under 35 U.S.C. 154(b) by 167 days.

(21) Appl. No.: 14/160,368

(22) Filed: Jan. 21, 2014

(65) Prior Publication Data

US 2015/0202970 A1 Jul. 23, 2015

(51) Int. Cl.
*H02J 7/00* (2006.01)
*B60L 11/18* (2006.01)
(Continued)

(52) U.S. Cl.
CPC ......... *B60L 11/182* (2013.01); *B60L 11/1829* (2013.01); *B60L 11/1831* (2013.01);
(Continued)

(58) Field of Classification Search
CPC ................................. H02J 5/005; H02J 7/025
(Continued)

(56) References Cited

U.S. PATENT DOCUMENTS

2006/0071632 A1* 4/2006 Ghabra et al. ................ 320/108
2009/0003022 A1* 1/2009 Nunoya et al. ................ 363/78
(Continued)

FOREIGN PATENT DOCUMENTS

| CN | 103158573 A | 6/2013 |
| DE | 102012006919 A1 | 10/2013 |
| EP | 2346136 A1 | 7/2011 |

OTHER PUBLICATIONS

International Search Report and Written Opinion—PCT/US2015/011218—ISA/EPO—May 4, 2015.

*Primary Examiner* — Suchin Parihar
(74) *Attorney, Agent, or Firm* — Knobbe, Martens, Olsen & Bear LLP

(57) ABSTRACT

Systems and methods in accordance with particular embodiments provide for alignment of an electric vehicle induction coil with a base system induction coil through a determination of the phase of a base system induction coil current signal. In certain embodiments, an electric vehicle induction coil that receives a transmission signal can be determined to be in greater alignment with a base system induction coil that transmits the transmission signal as the phases of the current signals at the base system induction coil and the electric vehicle induction coil converge. One embodiment includes a method of receiving wireless power, including detecting a transmission signal in a wireless power transmission, the transmission signal comprising periodic variations between a first frequency and a second frequency. The method further includes determining a phase of a base system induction coil signal based on the detected transmission signal.

29 Claims, 15 Drawing Sheets

(51) Int. Cl.
*H02J 5/00* (2016.01)
*H02J 7/02* (2016.01)

(52) U.S. Cl.
CPC ........... *B60L 11/1833* (2013.01); *H02J 5/005* (2013.01); *H02J 7/025* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
USPC .......................................................... 320/108
See application file for complete search history.

(56) References Cited

U.S. PATENT DOCUMENTS

| | | | |
|---|---|---|---|
| 2009/0322281 A1 | 12/2009 | Kamijo et al. | |
| 2010/0244577 A1* | 9/2010 | Shimokawa | 307/104 |
| 2010/0244580 A1 | 9/2010 | Uchida et al. | |
| 2010/0271011 A1* | 10/2010 | Shimizu | 324/207.13 |
| 2012/0001593 A1 | 1/2012 | Di Guardo | |
| 2012/0169133 A1 | 7/2012 | Lisi et al. | |
| 2012/0191242 A1 | 7/2012 | Outwater et al. | |
| 2012/0217111 A1* | 8/2012 | Boys et al. | 191/10 |
| 2012/0235636 A1* | 9/2012 | Partovi | H02J 7/025 |
| | | | 320/108 |
| 2013/0015720 A1 | 1/2013 | Shimokawa et al. | |
| 2013/0015812 A1* | 1/2013 | Boyer | B60L 11/182 |
| | | | 320/108 |
| 2013/0029595 A1 | 1/2013 | Widmer et al. | |
| 2013/0049674 A1* | 2/2013 | Davis | 320/101 |
| 2013/0099588 A1* | 4/2013 | Yeo | H02J 5/005 |
| | | | 307/104 |
| 2013/0110318 A1* | 5/2013 | Colja et al. | 701/2 |
| 2013/0334892 A1 | 12/2013 | Hall et al. | |
| 2014/0015328 A1 | 1/2014 | Beaver et al. | |
| 2014/0361628 A1* | 12/2014 | Huang et al. | 307/104 |
| 2015/0048788 A1* | 2/2015 | Doffin | B60L 11/1812 |
| | | | 320/108 |
| 2015/0084586 A1* | 3/2015 | Von Novak, et al. | 320/108 |
| 2015/0091521 A1* | 4/2015 | Blum | B60L 11/1812 |
| | | | 320/108 |
| 2015/0123619 A1* | 5/2015 | Marathe et al. | 320/137 |
| 2015/0130294 A1* | 5/2015 | Suzuki | H02J 17/00 |
| | | | 307/104 |
| 2015/0168544 A1 | 6/2015 | Ette et al. | |
| 2015/0202970 A1* | 7/2015 | Huang et al. | 320/108 |
| 2015/0246614 A1* | 9/2015 | Dames et al. | 320/108 |
| 2015/0323694 A1* | 11/2015 | Roy | H02J 17/00 |
| | | | 307/104 |
| 2016/0006290 A1* | 1/2016 | Ho | H02J 7/0044 |
| | | | 320/108 |
| 2016/0052405 A1* | 2/2016 | Koizumi | H02J 5/005 |
| | | | 320/108 |
| 2016/0056664 A1* | 2/2016 | Partovi | H02J 7/025 |
| | | | 307/104 |
| 2016/0297314 A1* | 10/2016 | Iwai | H02J 7/0027 |
| 2016/0380487 A1* | 12/2016 | Widmer | H02J 50/12 |
| | | | 324/654 |
| 2016/0380488 A1* | 12/2016 | Widmer | H04B 5/0037 |
| | | | 324/207.15 |

* cited by examiner

SYSTEMS AND METHODS FOR ELECTRIC VEHICLE INDUCTION COIL ALIGNMENT

FIELD

The present disclosure relates generally to wireless power transfer, and more specifically to devices, systems, and methods for wireless power transfer to remote systems, such as vehicles including batteries, and for aligning wireless power transfer devices.

BACKGROUND

Remote systems, such as vehicles, have been introduced that include locomotion power derived from electricity received from an energy storage device, such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless power charging systems that are capable of transferring power in free space (e.g., via a wireless field) to be used to charge electric vehicles may overcome some of the deficiencies of wired charging solutions. As such, wireless power charging systems and methods that efficiently and safely transfer power for charging electric vehicles are desirable.

Inductive power transfer (IPT) systems are one means for the wireless transfer of energy. In IPT, a primary (or "base") power device transmits power to a secondary (or "pick-up") power receiver device. Each of the transmitter and receiver power devices include inductors, typically coils or windings of electric current conveying media. An alternating current in the primary inductor produces a fluctuating electromagnetic field. When the secondary inductor is placed in proximity to the primary inductor, the fluctuating electromagnetic field induces an electromotive force (EMF) in the secondary inductor, thereby transferring power to the secondary power receiver device.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

In a particular embodiment, a method of receiving wireless power, includes detecting a transmission signal in a wireless power transmission. The transmission signal includes periodic variations between a first frequency and a second frequency. The method further includes determining a phase of a base system induction coil signal based on the detected transmission signal.

In another particular embodiment, a wireless power receiver includes an electric vehicle induction coil configured to receive a wireless power transmission at a level sufficient to charge an electric vehicle. The wireless power receiver further includes a detector configured to detect a transmission signal in the wireless power transmission. The transmission signal includes periodic variations between a first frequency and a second frequency. The wireless power receiver further includes an electric vehicle controller configured to determine a phase of a base system induction coil signal based on the detected transmission signal.

In another particular embodiment, a wireless power receiver includes means for detecting a transmission signal in a wireless power transmission. The transmission signal including periodic variations between a first frequency and a second frequency. The wireless power receiver further includes means for determining a phase of a base system induction coil signal based on the detected transmission signal.

In another particular embodiment, a wireless power receiver includes a computer-readable medium comprising instructions that when executed by a computer causes the computer to perform a method of communication among mobile devices. The method includes detecting a transmission signal in a wireless power transmission. The transmission signal includes periodic variations between a first frequency and a second frequency. The method further includes determining a phase of a base system induction coil signal based on the detected transmission signal.

Figure 1:
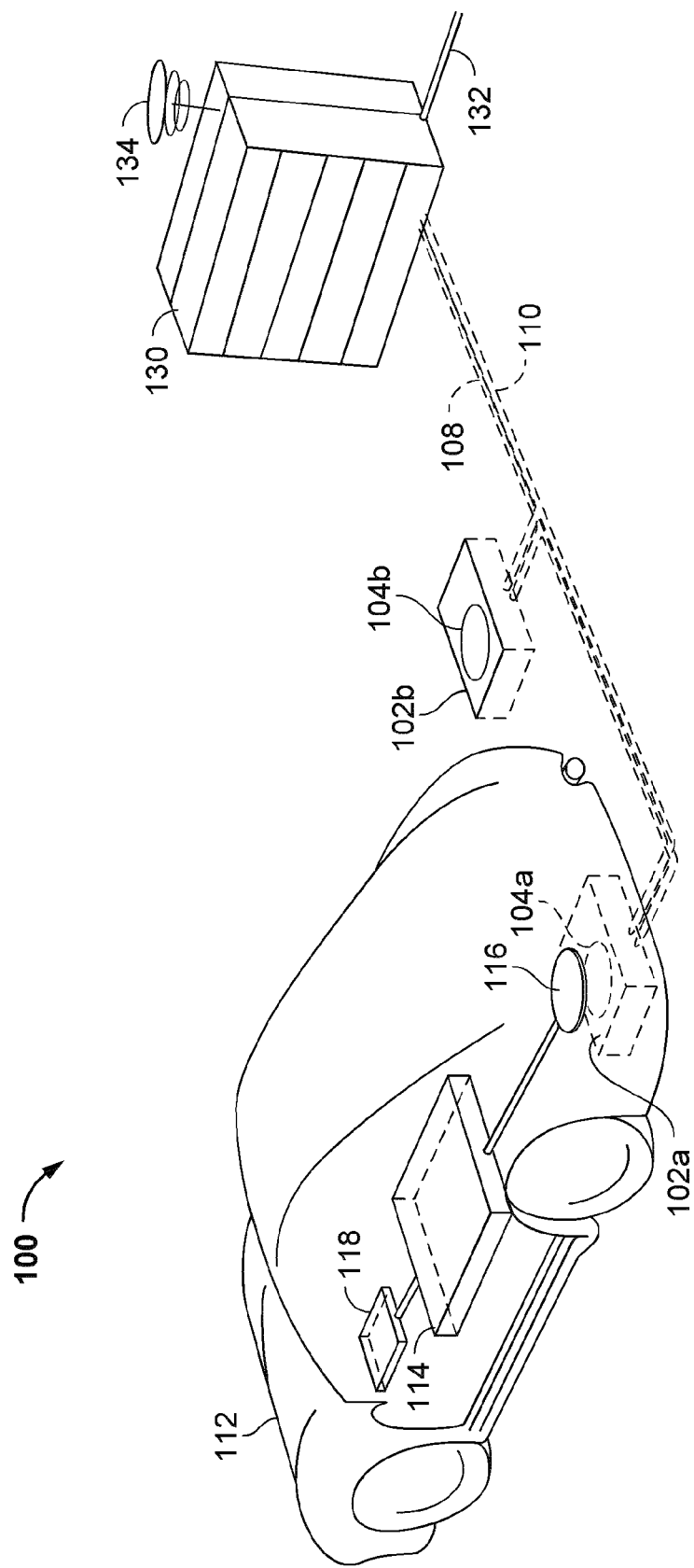
FIG. 1 is a diagram of an exemplary wireless power transfer system for charging an electric vehicle, in accordance with an exemplary embodiment.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments and is not intended to represent the only embodiments that may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments. The exemplary embodiments of the invention may be practiced without these specific details. In some instances, well-known structures and devices are shown in block diagram form in order to avoid obscuring the novelty of the exemplary embodiments presented herein.

Inductive power transfer (IPT) systems may transfer power optimally when the primary and secondary inductors are aligned. It is therefore desirable for an electric vehicle wireless power charging system to include a system for ensuring the vehicle is positioned to optimize alignment of the inductors prior to the start of charging.

As well as sub-optimal power transfer, there may be a safety risk if a primary inductor is energized for charging before the secondary inductor is correctly aligned. For example, an electric vehicle charging system may include ground-mounted power devices in which the primary inductor is housed that are easily accessible to bystanders and may be open for debris or the like to rest on or nearby the device. There may be a risk, be it perceived or real, to humans or animals from exposure to electromagnetic fields. Also, some types of materials resting on a wireless power transfer base device may be vulnerable to ignition. If a vehicle without a pick-up power device is positioned over an energized primary device, heating of parts of the vehicle may occur, which could be hazardous. As a result, some countries or regions may impose safety standards with which electric vehicle charging systems are legally required to comply. It is therefore desirable to minimize any such risks with wireless power transfer systems without significant expense and complexity.

Base charging devices may be equipped with sensors for detecting the presence of debris or moving objects near the device and refrain from energizing when a positive detection is made. However, in some instances, sensors are prone to error and involve the cost and complexity of additional componentry.

Electric vehicle IPT systems may use a variety of alignment systems to align the electric vehicle and charging device inductors and then to communicate that alignment has been achieved to the charging device, thus enabling it to safely energize. For example, alignment systems may include mechanical guides, sensors or wireless communication links (e.g. RF communication, Bluetooth, etc) that provide feedback to a driver or vehicle guidance system. Once adequate alignment is achieved, a signal is sent back to the charging device, which is then able to safely energize. However, in some instances, such alignment mechanisms add complexity and cost to a wireless power transfer system because of the need for additional componentry for the alignment systems.

FIG. 1 is a diagram of an exemplary wireless power transfer system 100 for charging an electric vehicle 112, in accordance with an exemplary embodiment. The wireless power transfer system 100 enables charging of an electric vehicle 112 while the electric vehicle 112 is parked near a base wireless power charging system 102a. Spaces for two electric vehicles are illustrated in a parking area to be parked over corresponding base wireless power charging system 102a and 102b. In some embodiments, a local distribution center 130 may be connected to a power backbone 132 and configured to provide an alternating current (AC) or a direct current (DC) supply through a power link 110 to the base wireless power charging system 102a. The base wireless power charging system 102a also includes a base system induction coil 104a for wirelessly transferring or receiving power. An electric vehicle 112 may include a battery unit 118, an electric vehicle induction coil 116, and an electric vehicle charging system 114. The electric vehicle induction coil 116 may interact with the base system induction coil 104a, for example, via a region of the electromagnetic field generated by the base system induction coil 104a.

In some exemplary embodiments, the electric vehicle induction coil 116 may receive power when the electric vehicle induction coil 116 is located in an energy field produced by the base system induction coil 104a. The field corresponds to a region where energy output by the base system induction coil 104a may be captured by an electric vehicle induction coil 116. In some cases, the field may correspond to the "near field" of the base system induction coil 104a. The near-field may correspond to a region in which there are strong reactive fields resulting from the currents and charges in the base system induction coil 104a that do not radiate power away from the base system induction coil 104a. In some cases, the near-field may correspond to a region that is within about $1/2\pi$ of wavelength of the base system induction coil 104a (and vice versa for the electric vehicle induction coil 116).

Local distribution 130 may be configured to communicate with external sources (e.g., a power grid) via a communication backhaul 134, and with the base wireless power charging system 102a via a communication link 108.

In some embodiments, the electric vehicle induction coil 116 may be aligned with the base system induction coil 104a and, therefore, disposed within a near-field region simply by the driver positioning the electric vehicle 112 correctly relative to the base system induction coil 104a. Additionally or alternatively, the driver may be given visual feedback, auditory feedback, or combinations thereof to determine when the electric vehicle 112 is properly placed for wireless power transfer. Additionally or alternatively, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without driver intervention or with minimal driver intervention if, for instance, the electric vehicle 112 is equipped with a servo steering wheel, ultrasonic sensors, and intelligence to adjust the vehicle. Additionally or alternatively, the electric vehicle induction coil 116, the base system induction coil 104a, or a combination thereof may have functionality for displacing and moving the induction coils 116 and 104a relative to each other to more accurately orient them and develop more efficient coupling therebetween.

The base wireless power charging system 102a may be located in a variety of locations. As examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetic and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless power charging system 102a transfers power to the electric vehicle 112 and the electric vehicle 112 transfers power to the base wireless power charging system 102a, for example, in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

Figure 2:
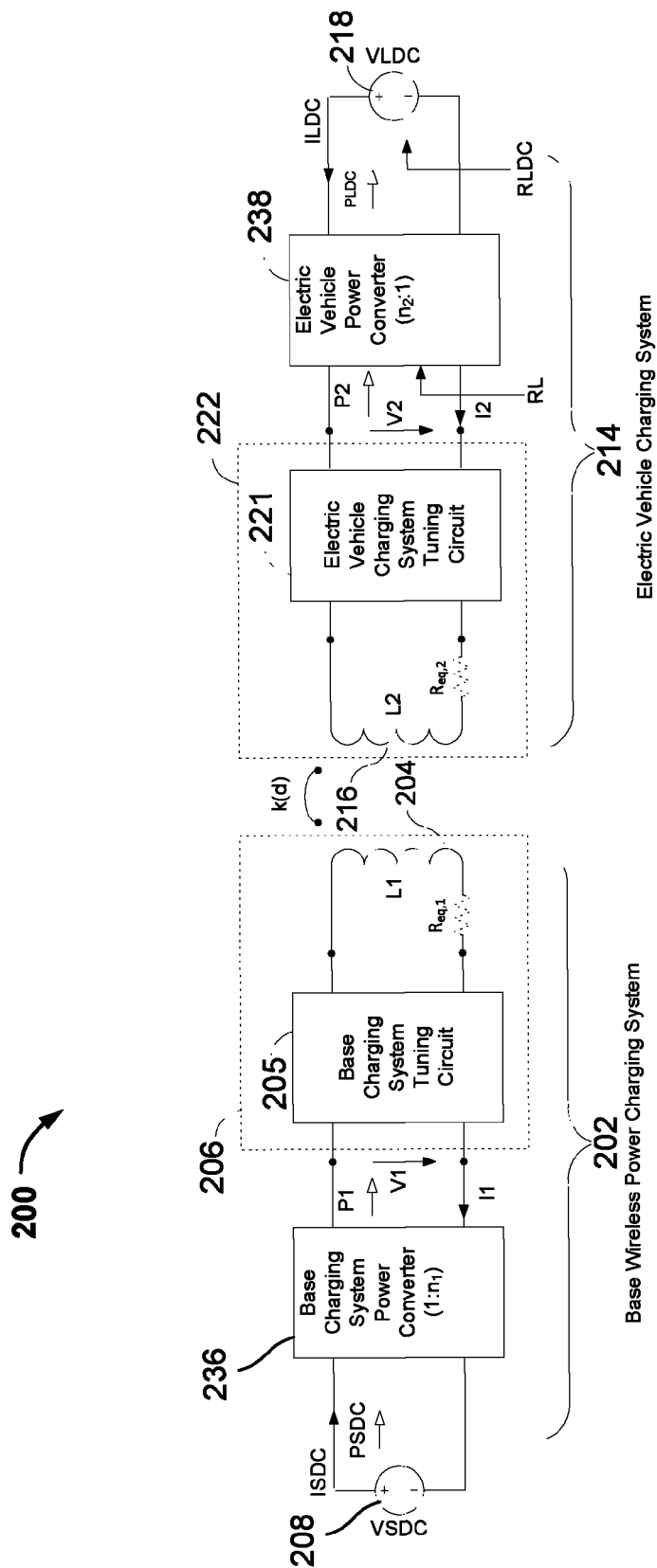
FIG. 2 is a schematic diagram of exemplary core components of the wireless power transfer system of FIG. 1.

FIG. 2 is a schematic diagram of exemplary core components of the wireless power transfer system 100 of FIG. 1. As shown in FIG. 2, the wireless power transfer system 200 may include a base system transmit circuit 206 including a base system induction coil 204 having an inductance $L_1$. The wireless power transfer system 200 further includes an electric vehicle receive circuit 222 including an electric vehicle induction coil 216 having an inductance $L_2$. Embodiments described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency.

A resonant frequency may be based on the inductance and capacitance of a transmit circuit including an induction coil (e.g., the base system induction coil 204). As shown in FIG. 2, inductance may generally be the inductance of the induction coil, whereas, capacitance may be added to the induction coil to create a resonant structure at a desired resonant frequency. As an example, a capacitor may be added in series with the induction coil to create a resonant circuit (e.g., the base system transmit circuit 206) that generates an electromagnetic field. Accordingly, for larger diameter induction coils, the value of capacitance for inducing resonance may decrease as the diameter or inductance of the coil increases. Inductance may also depend on a number of turns of an induction coil. Furthermore, as the diameter of the induction coil increases, the efficient energy transfer area of the near field may increase. Other resonant circuits are possible. As another example, a capacitor may be placed in parallel between the two terminals of the induction coil (e.g., a parallel resonant circuit). Furthermore, an induction coil may be designed to have a high quality (Q) factor to improve the resonance of the induction coil.

The coils may be used for the electric vehicle induction coil 216 and the base system induction coil 204. Using resonant structures for coupling energy may be referred to "magnetic coupled resonance," "electromagnetic coupled resonance," and/or "resonant induction." The operation of the wireless power transfer system 200 will be described based on power transfer from a base wireless power charging system 202 to an electric vehicle charging system 214 of an electric vehicle 112, but is not limited thereto. For example, the electric vehicle 112 may transfer power to the base wireless power charging system 202.

With reference to FIG. 2, a power supply 208 (e.g., AC or DC) supplies power $P_{SDC}$ to the base wireless power charging system 202 to transfer energy to an electric vehicle 112. The base wireless power charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power $P_1$ to the base system transmit circuit 206 including a base charging system tuning circuit 205 which may consist of reactive tuning components in a series or parallel configuration or a combination of both with the base system induction coil 204 to emit an electromagnetic field at a desired frequency. The capacitor $C_1$ may be provided to form a resonant circuit with the base system induction coil 204 that resonates at a desired frequency.

Both the base system transmit circuit 206 including the base system induction coil 204 and electric vehicle receive circuit 222 including the electric vehicle induction coil 216 may be tuned to substantially the same frequencies and may be positioned within the near-field of an electromagnetic field transmitted by one of the base system induction coil 204 and the electric vehicle induction coil 216. In this case, the base system induction coil 204 and electric vehicle induction coil 216 may become coupled to one another such that power may be transferred to the electric vehicle receive circuit 222 including an electric vehicle charging system tuning circuit 221 and electric vehicle induction coil 216. The electric vehicle charging system tuning circuit 221 may be provided to form a resonant circuit with the electric vehicle induction coil 216 that resonates at a desired frequency. The mutual coupling coefficient resulting at coil separation is represented by element k(d). Equivalent resistances $R_{eq,1}$ and $R_{eq,2}$ represent the losses that may be inherent to the induction coils 204 and 216 and any anti-reactance capacitors that may, in some embodiments, be provided in the base charging system tuning circuit 205 and electric vehicle charging system tuning circuit 221, respectively. The electric vehicle receive circuit 222 including the electric vehicle induction coil 216 and electric vehicle charging system tuning circuit 221 receives power $P_2$ and provides the power $P_2$ to an electric vehicle power converter 238 of an electric vehicle charging system 214.

The electric vehicle power converter 238 may include, for example, a LF/DC converter configured to convert power at an operating frequency back to DC power at a voltage level matched to the voltage level of an electric vehicle battery unit 218. The electric vehicle power converter 238 may provide the converted power $P_{LDC}$ to charge the electric vehicle battery unit 218. The power supply 208, base charging system power converter 236, and base system induction coil 204 may be stationary and located at a variety of locations as discussed in this disclosure. The battery unit 218, electric vehicle power converter 238, and electric vehicle induction coil 216 may be included in an electric vehicle charging system 214 that is part of electric vehicle 112 or part of the battery pack (not shown). The electric vehicle charging system 214 may also be configured to provide power wirelessly through the electric vehicle induction coil 216 to the base wireless power charging system 202 to feed power back to the grid. Each of the electric vehicle induction coil 216 and the base system induction coil 204 may act as transmit or receive induction coils based on the mode of operation.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle induction coil 216 to the electric vehicle power converter 238. Disconnecting the electric vehicle induction coil 216 may suspend charging and also may adjust the "load" as "seen" by the base wireless power charging system 202 (acting as a transmitter), which may be used to decouple the electric vehicle charging system 214 (acting as the receiver) from the base wireless power charging system 202. The load changes may be detected if the transmitter includes the load sensing circuit. Accordingly, the transmitter, such as a base wireless power charging system 202, may have a mechanism for determining when receivers, such as an electric vehicle charging system 214, are present in the near-field of the base system induction coil 204.

In operation, assuming energy transfer towards the vehicle or battery, input power is provided from the power supply 208 such that the base system induction coil 204 generates a field for providing the energy transfer. The electric vehicle induction coil 216 couples to the radiated field and generates output power for storage or consumption by the electric vehicle charging system 214 or the electric vehicle battery unit 218 of the electric vehicle 112. As described above, in some embodiments, the base system induction coil 204 and electric vehicle induction coil 216 are configured according to a mutual resonant relationship such that when the resonant frequency of the electric vehicle induction coil 216 and the resonant frequency of the base system induction coil 204 are very close or substantially the same. Transmission losses between the base wireless power charging system 202 and electric vehicle charging system 214 are minimal when the electric vehicle induction coil 216 is located in the near-field of the base system induction coil 204.

An efficient energy transfer may occur by coupling a large portion of the energy in the near field of a transmitting induction coil to a receiving induction coil rather than propagating most of the energy in an electromagnetic wave to the far-field. When in the near field, a coupling mode may be established between the transmit induction coil and the receive induction coil. The area around the induction coils where this near field coupling may occur may be referred to herein as a near field coupling mode region.

While not shown, the base charging system power converter 236 and the electric vehicle power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge one or more batteries.

The electric vehicle induction coil 216 and base system induction coil 204 may be referred to or configured as "loop" antennas, and more specifically, multi-turn loop antennas. The induction coils 204 and 216 may also be referred to herein or be configured as "magnetic" antennas. The term "coils" is intended to refer to a component that may wirelessly output or receive energy four coupling to another "coil." The coil may also be referred to as an "antenna" of a type that is configured to wirelessly output or receive power. Loop (e.g., multi-turn loop) antennas may be configured to include an air core or a physical core such as a ferrite core. An air core loop antenna may allow the placement of other components within the core area. Physical core antennas including ferromagnetic or ferrimagnetic materials may allow development of a stronger electromagnetic field and improved coupling.

Efficient transfer of energy between a transmitter and receiver may occur during matched or nearly matched resonance between a transmitter and a receiver. Further, even when resonance between a transmitter and receiver are not matched, energy may be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

According to some embodiments, coupling power between two induction coils that are in the near field of one another is disclosed. The near field may correspond to a region around the induction coil in which electromagnetic fields exist but may not propagate or radiate away from the induction coil. Near-field coupling-mode regions may correspond to a volume that is near the physical volume of the induction coil, typically within a small fraction of the wavelength. According to some embodiments, electromagnetic induction coils, such as single and multi turn loop antennas, are used for both transmitting and receiving since magnetic near field amplitudes in practical embodiments tend to be higher for magnetic type coils in comparison to the electric near fields of an electric type antenna (e.g., a small dipole). This allows for potentially higher coupling between the pair. Furthermore, "electric" antennas (e.g., dipoles and monopoles) or a combination of magnetic and electric antennas may be used.

Figure 3:
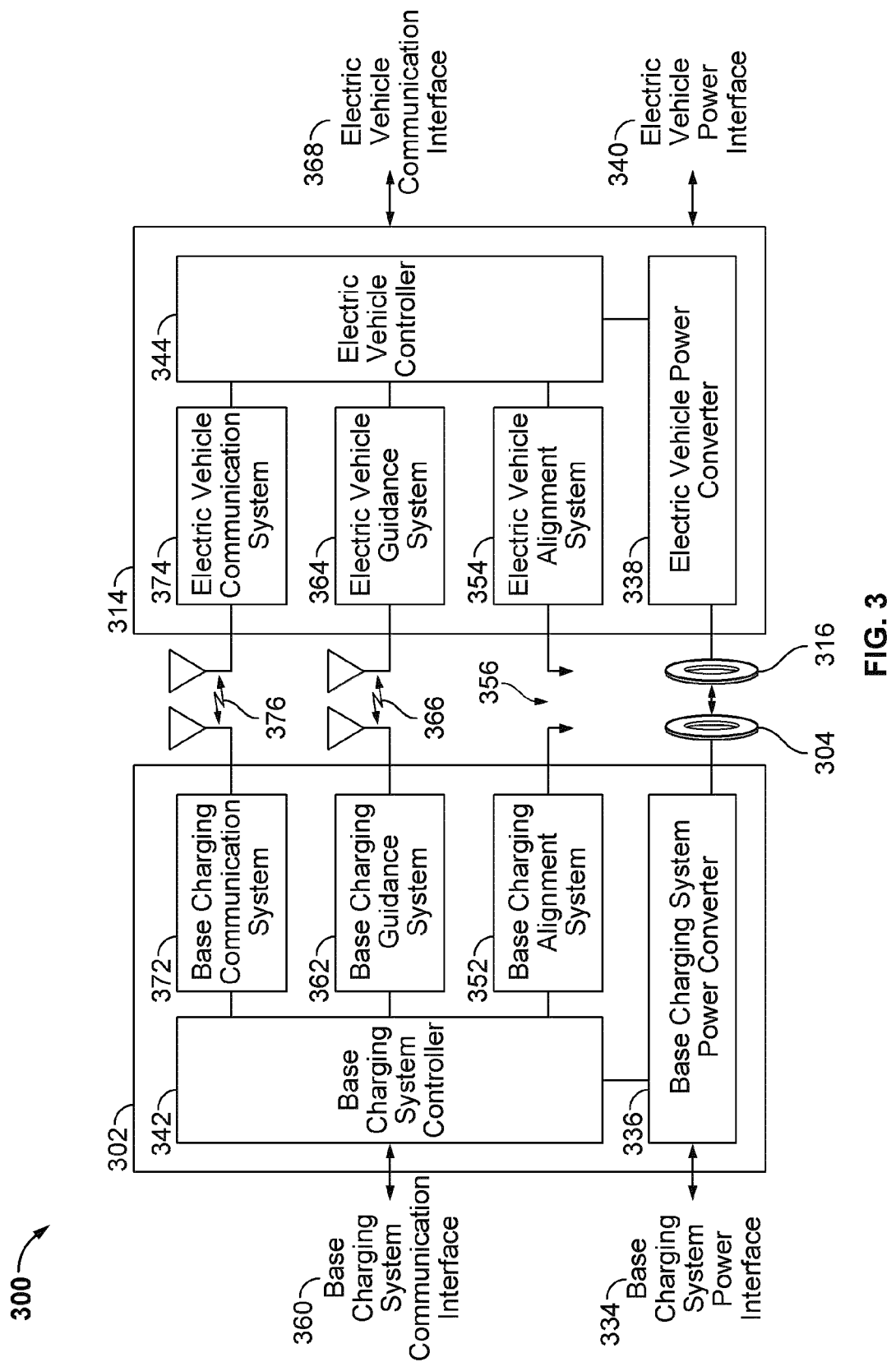
FIG. 3 is another functional block diagram showing exemplary core and ancillary components of the wireless power transfer system of FIG. 1.

FIG. 3 is a functional block diagram showing exemplary core and ancillary components of the wireless power transfer system 100 of FIG. 1. The wireless power transfer system 300 illustrates a communication link 376, a guidance link 366, and alignment systems 352, 354 for the base system or transmitter inductor 304 and electric vehicle or receiver inductor 316. As described above with reference to FIG. 2, and with reference to the use of the system when energy flow is towards an electric vehicle, in FIG. 3 a base charging system power interface 334 may be configured to provide power to a charging system power converter 336 from a power source, such as an AC or DC power supply. The base charging system power converter 336 may receive AC or DC power from the base charging system power interface 334 to excite the base system induction coil 304 at or near its resonant frequency. The electric vehicle inductor 316, when in the near field coupling-mode region, may receive energy from the near field coupling mode region to oscillate at or near the resonant frequency. The electric vehicle power converter 338 converts the oscillating signal from the electric vehicle induction coil 316 to a power signal suitable for charging a battery via the electric vehicle power interface 340.

The base wireless power charging system 302 includes a base charging system controller 342 and the electric vehicle charging system 314 includes an electric vehicle controller 344. The base charging system controller 342 may include a base charging system communication interface 360 to other systems such as, for example, a computer, and a power distribution center, or a smart power grid. The electric vehicle controller 344 may include an electric vehicle communication interface 368 to other systems such as, for example, an on-board computer on the vehicle, other battery charging controller, other electronic systems within the vehicles, and remote electronic systems.

The base charging system controller 342 and electric vehicle controller 344 may include subsystems or modules for specific application with separate communication channels. These communications channels may be separate physical channels or separate logical channels. As examples, a base charging alignment system 352 may communicate with an electric vehicle alignment system 354 through an alignment link 356 to provide a feedback mechanism for more closely aligning the base system induction coil 304 and electric vehicle induction coil 316, autonomously and/or with operator assistance. Similarly, a base charging guidance system 362 may communicate with an electric vehicle guidance system 364 through a guidance link 366 to provide a feedback mechanism to guide the electric vehicle autonomously and/or with operator assistance in aligning the base system induction coil 304 and electric vehicle induction coil 316. Further, there may be separate general-purpose communication links (e.g., channels) supported by base charging communication system 372 and electric vehicle communication system 374 for communicating other information between the base wireless power charging system 302 and the electric vehicle charging system 314. This information may include information about electric vehicle characteristics, battery characteristics, charging status, and power capabilities of both the base wireless power charging system 302 and the electric vehicle charging system 314, as well as maintenance and diagnostic data for an electric vehicle. These communication channels may be separate physical communication channels such as, for example, Bluetooth, zigbee, cellular, and the like.

Electric vehicle controller 344 may also include a parking assistance system based on microwave or ultrasonic radar principles, a brake system configured to perform a semi-automatic parking operation, and a steering wheel servo system configured to assist with a largely automated parking 'park by wire' that may provide higher parking accuracy, thus reducing the need for mechanical horizontal induction coil alignment in the base wireless power charging system 302 and the electric vehicle charging system 314. Further, electric vehicle controller 344 may be configured to communicate with electronics of the electric vehicle 112. For example, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, and the like), and audio input devices (e.g., microphone with electronic voice recognition).

Furthermore, the wireless power transfer system 300 may include detection and sensor systems. For example, the wireless power transfer system 300 may include sensors for use with systems to properly guide the driver or the vehicle to the charging spot, sensors to mutually align the induction coils with the required separation/coupling, sensors to detect objects that may obstruct the electric vehicle induction coil 316 from moving to a particular height and/or position to achieve coupling, and safety sensors for use with systems to perform a reliable, damage free, and safe operation of the system. For example, a safety sensor may include a sensor for detection of presence of animals or children approaching the wireless power transmitter/receiver devices 304, 316 beyond a safety radius, detection of metal objects near the base system induction coil 304 that may be heated up (for example, due to induction heating), detection of hazardous events such as incandescent objects on the base system inductor 304, and temperature monitoring of the base wireless power charging system 302 and electric vehicle charging system 314 components.

To communicate between a base wireless power charging system 302 and an electric vehicle charging system 314, the wireless power transfer system 300 may use both in-band signaling and an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

In addition, some communication may be performed via the wireless power link without using specific communications antennas. For example, the wireless power inductors 304 and 316 may also be configured to act as wireless communication transmitters. Thus, some embodiments of the base wireless power charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base charging system power converter 336 may include a load sensing circuit (not shown) for detecting the presence or absence of active electric vehicle receivers in the vicinity of the near field generated by the base system induction coil 304. By way of example, a load sensing circuit monitors the current flowing to the power amplifier, which is affected by the presence or absence of active receivers in the vicinity of the near field generated by base system induction coil 304. Detection of changes to the loading on the power amplifier may be monitored by the base charging system controller 342 for use in determining whether to enable the oscillator for transmitting energy, to communicate with an active receiver, or a combination thereof.

Although various systems for electric vehicle inductive power transfer are discussed above, systems for electric vehicle inductive power transfer can be implemented in various additional ways in accordance with different embodiments. Systems and methods for determining a phase of a transmission signal for electric vehicle induction coil alignment are discussed below.

Figure 4:
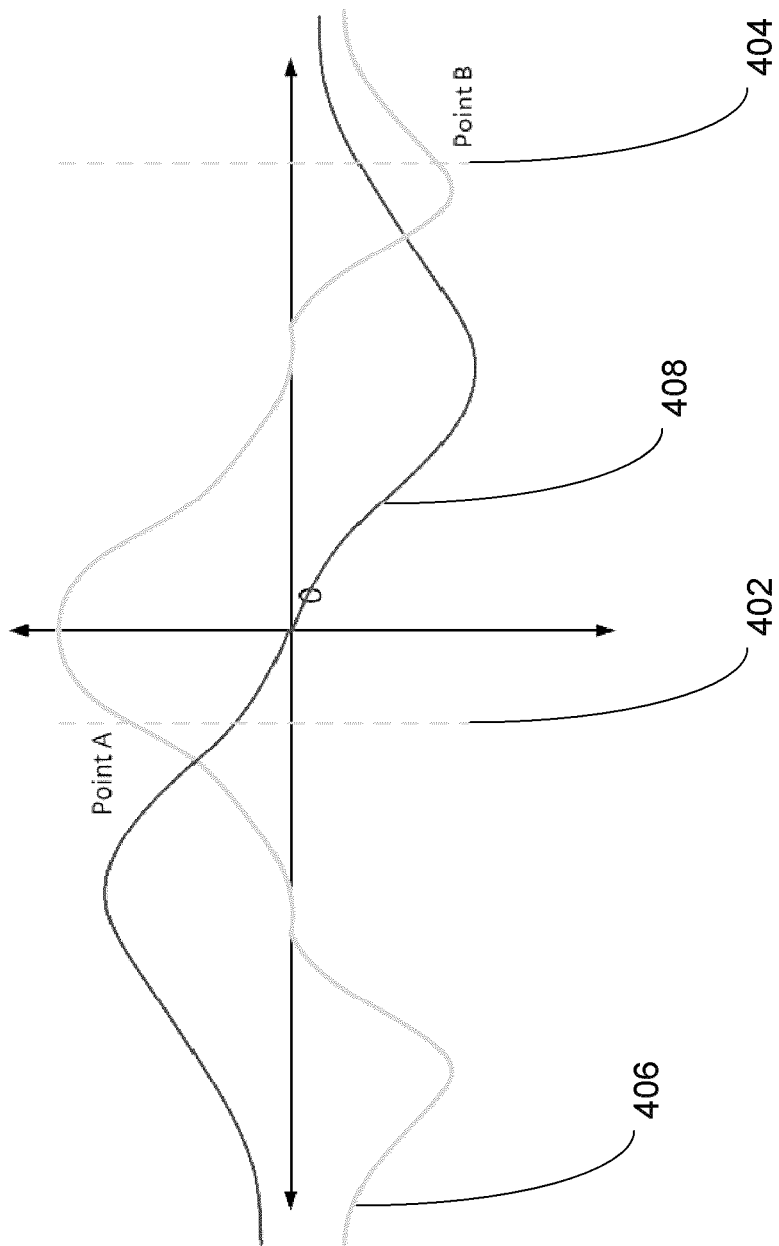
FIG. 4 illustrates a phase difference between a base system induction coil current signal and an electric vehicle induction coil current signal of FIG. 1 in accordance with an exemplary embodiment.

During electric vehicle induction coil position detection, measurement of an electric vehicle charging system's short circuit current can be used to obtain the magnitude and phase of an associated electric vehicle induction coil. In addition, in particular applications, a magnitude of a base system induction coil current signal can be known, such as but not limited from the specifications of a base wireless power charging system. However, merely having information concerning a magnitude and phase of an electric vehicle induction coil current signal along with the magnitude of a base system induction coil current signal is insufficient to adequately determine the location of an electric vehicle induction coil relative to a base system induction coil. For example, FIG. 4 illustrates a phase difference between a base system induction coil current signal 406 and an electric vehicle induction coil current signal 408 of FIG. 1 in accordance with an exemplary embodiment. Although the ratio of the magnitude of a base system induction coil current signal 406 relative to the magnitude of the electric vehicle induction coil current signal 408 is the same at point A 402 and point B 404, the displacement between the coils is much greater at point B 404 than at point A 402. To remedy this issue, systems and methods in accordance with particular embodiments provide for alignment of an electric vehicle induction coil with a base system induction coil through a determination of the phase of base system induction coil current signal.

In certain embodiments, an electric vehicle induction coil that receives a transmission signal can be determined to be in greater alignment with a base system induction coil that transmits the transmission signal as the phases of the current signals at the base system induction coil and the electric vehicle induction coil converge. The transmission signal can be a current signal at a base system induction coil transmitted as a magnetic wave and induced as a current signal at an electric vehicle induction coil. The phase of a base system induction coil current signal can be determined based upon periodic variations between a first frequency and a second frequency within the transmission signal. The timing of the periodic variations can be used as an indication of the phase of a current signal at the base system induction coil. Furthermore, the first frequency and second frequency can be generated by applying a step change to an operating frequency of the transmission signal. Although a current signal is discussed herein, a similar determination concerning the alignment of an electric vehicle induction coil and a base system induction coil based upon a voltage signal of either the electric vehicle induction coil or the base system induction coil can be made in accordance with a number of embodiments. Furthermore, although a discussion of a single electric vehicle induction coil is discussed herein, the same processes can be repeated for multiple electric vehicle induction coils of a single electric vehicle in accordance with a number of embodiments.

Figure 5A:
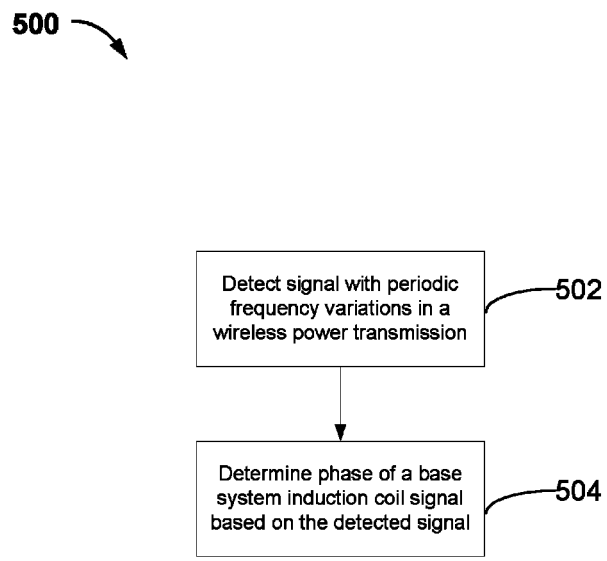
FIG. 5A illustrates a flowchart of operations that may be performed by an electric vehicle controller, such as the electric vehicle controller of FIG. 3 in accordance with an exemplary embodiment.

FIG. 5A illustrates a flowchart of operations that may be performed by an electric vehicle controller, such as the electric vehicle controller 344 of FIG. 3 in accordance with an exemplary embodiment. As described above, the electric vehicle controller 344 may perform additional processes to determine the phase of a current signal at a base system induction coil. In an embodiment, the electric vehicle controller 344 may begin at block 502. Although the process 500 in FIG. 5A is illustrated in a particular order, in certain embodiments the blocks herein may be performed in a different order, or omitted, and additional blocks can be added. A person of ordinary skill in the art will appreciate that the process of the illustrated embodiment may be implemented in any controller in order to determine the phase of a base system induction coil.

At block 502, the electric vehicle controller 344 detects a transmission signal in a wireless power transmission, the transmission signal including periodic variations between a first frequency and a second frequency. In certain embodiments, the transmission signal can be detected as induced at an electric vehicle induction coil.

At block 504, the electric vehicle controller 344 determines a phase of a base system induction coil current signal based on the detected transmission signal as induced at the electric vehicle induction coil. In specific embodiments, the phase of a base system induction coil current signal can be determined based upon periodic variations between a first frequency and a second frequency within a transmission signal of the wireless power transmission. The timing of the periodic variations can be used as an indication of the phase of the base system induction coil current signal.

Figure 5B:
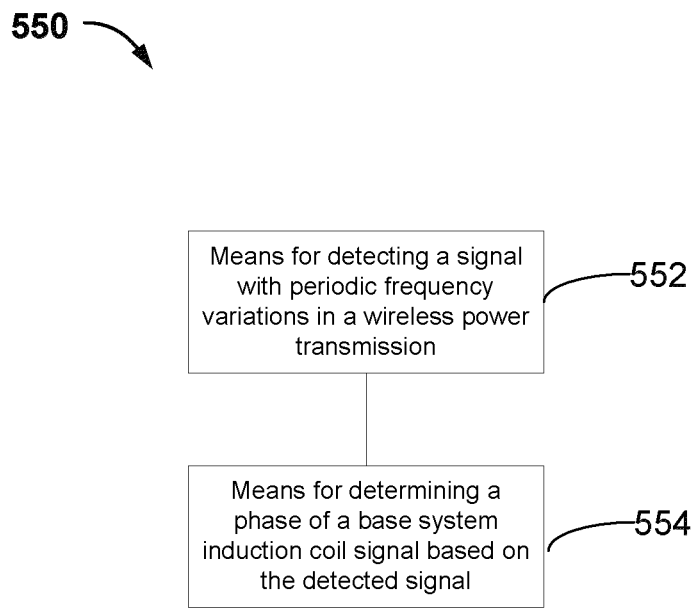
FIG. 5B is a functional block diagram of an electric vehicle charging system that can be employed to perform the process of FIG. 5A in accordance with an exemplary embodiment.

FIG. 5B is a functional block diagram of an electric vehicle charging system that can be employed to perform the process of FIG. 5A in accordance with an exemplary embodiment. The electric vehicle charging system 550 can include means 552 for detecting a signal with periodic frequency variations in a wireless power transmission. In certain embodiments, the means 552 for detecting a signal with periodic frequency variations in a wireless power transmission can be configured to perform one or more of the functions with respect to block 502 (FIG. 5A). In various embodiments, the means 552 for detecting a signal with periodic frequency variations in a wireless power transmission comprises an electric vehicle controller 344 (FIG. 3).

The electric vehicle charging system 550 can also include means 554 for determining a phase of a base system induction coil based on the detected signal. In certain embodiments, the means 554 for determining a phase of a base system induction coil based on the detected signal can be configured to perform one or more of the functions with respect to block 504 (FIG. 5A). In various embodiments, the means 554 for determining a phase of a base system induction coil based on the detected signal comprises an electric vehicle controller 344 (FIG. 3).

Figure 6:
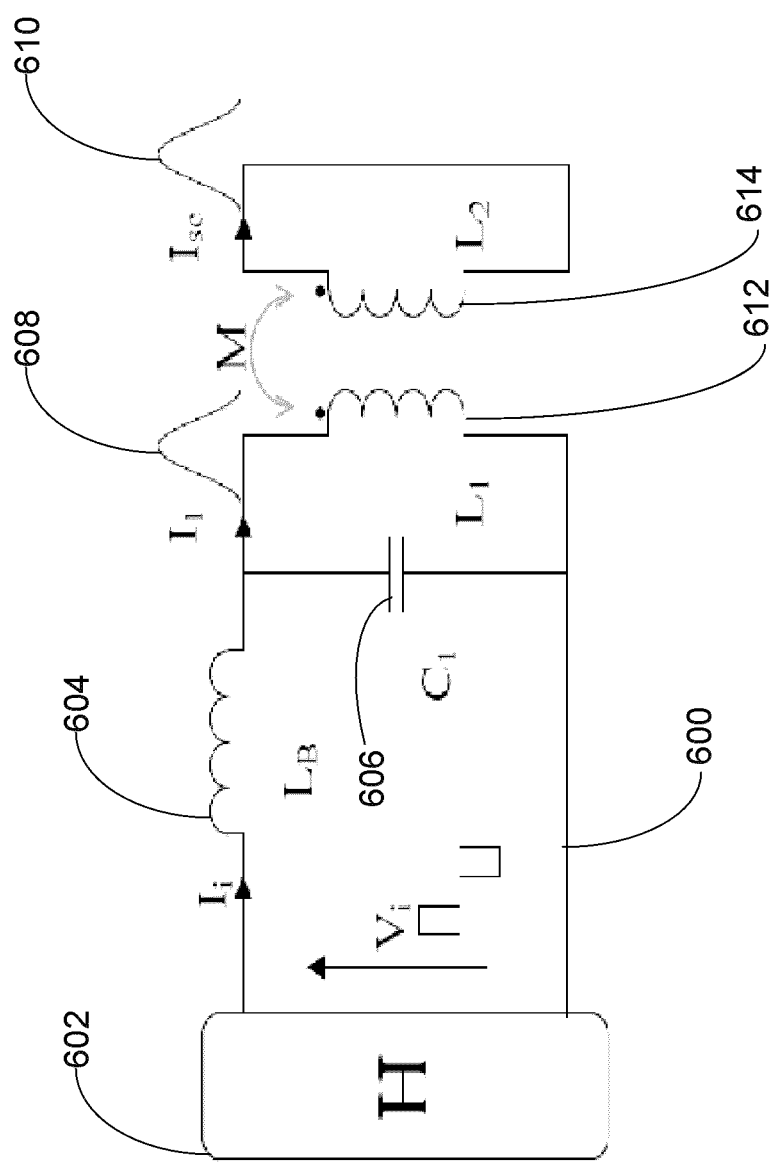
FIG. 6 is a conceptual diagram of a base wireless charging system of FIG. 2 with a base system power converter in accordance with an exemplary embodiment.

A conceptual diagram of a base wireless charging system 600 of FIG. 2 with a base system power converter in accordance with an exemplary embodiment is illustrated in FIG. 6. The base wireless charging system 600 includes a base charging system power converter 602 capable of converting a power signal to an AC signal for manipulation by a base charging system tuning circuit 205 that includes an inductor 604 and a capacitor 606 to generate a transmission signal as base system induction coil current signal 608. The transmission signal can be transmitted by the base system induction coil 612 to induce a transmission signal as an electric vehicle induction coil 614 current signal 610.

In certain embodiments, the base wireless charging system 600 can be configured to generate a transmission signal with a first frequency and a second frequency modulated onto an operating frequency of the transmission signal by applying a step change to the operating frequency of the transmission signal. In various embodiments, a step change can be applied as a step change of voltage or current applied at a DC to AC converter (such as but not limited to an inverter) of the base wireless charging system. In certain embodiments, a step change can be detected quickly at an electric vehicle induction coil when a conduction angle is high. In specific embodiments, a step change can be detected at an electric vehicle induction coil one half cycle after the step change is applied at the base wireless charging system if the conduction angle is low. In particular embodiments, a base wireless charging system can be implemented with a conduction angle configured to achieve a low current at the base system induction coil. In select embodiments, a step change applied to the operating frequency can be applied at a significantly lower frequency than the transmission signal's operating frequency (such as but not limited to a range of 100-500 Hz). An electric vehicle controller can more easily detect periodic variations in frequency and extract the phase information concerning a base system induction coil current signal from a transmission signal as an induced electric vehicle induction coil current signal when the step change is at a significantly lower frequency than the transmission signal's operating frequency.

Figure 7:
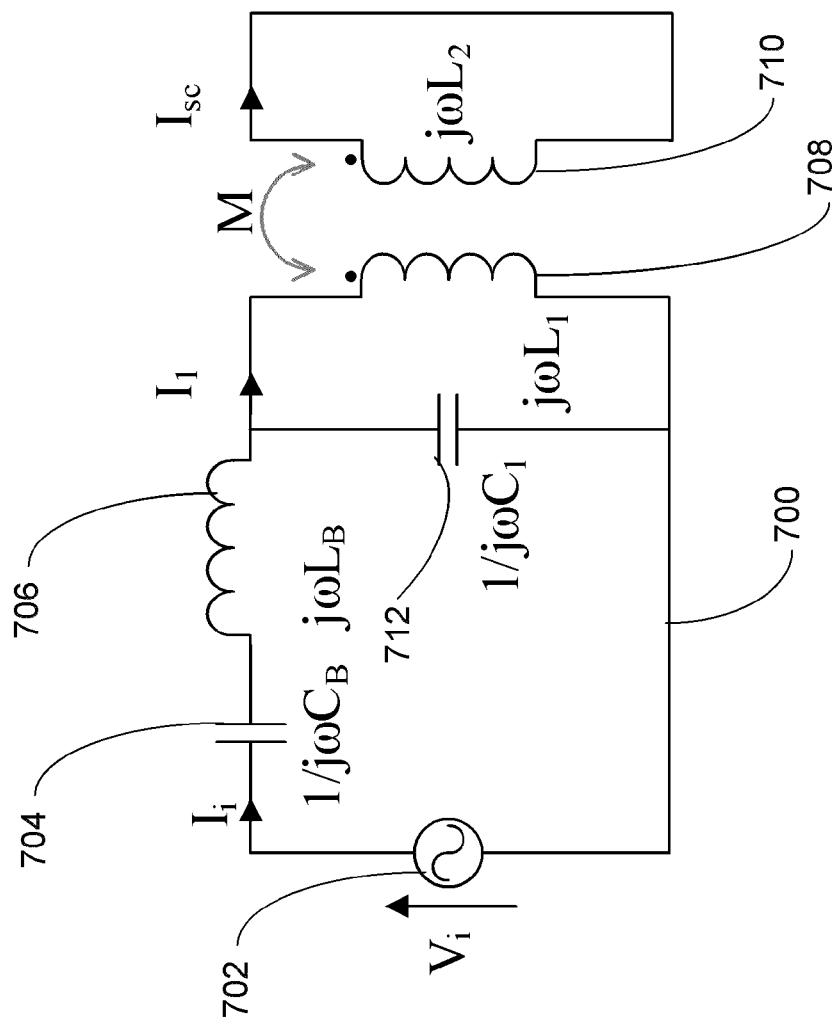
FIG. 7 is a conceptual diagram of the base wireless charging system of FIG. 6 with a voltage source in accordance with an exemplary embodiment.

A conceptual diagram of the base wireless charging system of FIG. 6 with a voltage source in accordance with an exemplary embodiment is illustrated in FIG. 7. The base wireless charging system 700 includes a voltage source 702 in series with a base capacitor 704 with value $C_B$ and a base inductor 706 with value $L_B$. The base wireless charging system 700 also includes a base system induction coil in parallel with a first capacitor 712 with value $C_1$. The base system induction coil 708 is configured to generate a magnetic field that induces a current at an electric vehicle induction coil 710.

Figure 8:
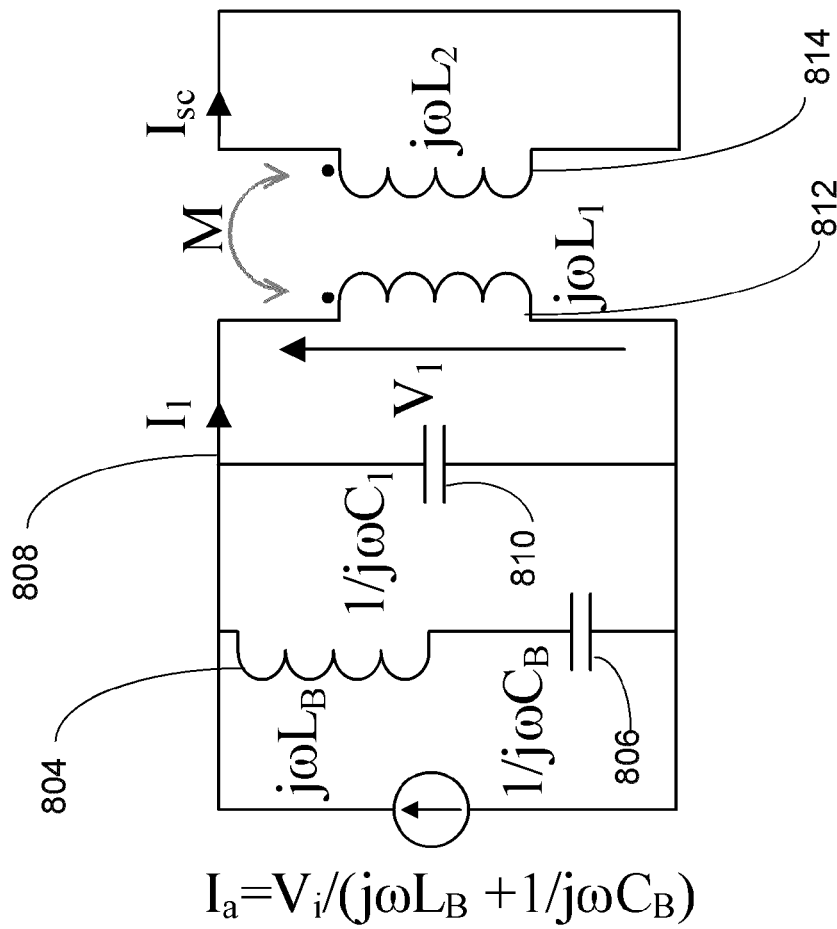
FIG. 8 is a conceptual diagram of a Norton-transform equivalent of the base wireless charging system of FIG. 7 in accordance with an exemplary embodiment.

A conceptual diagram of a Norton-transform equivalent of the base wireless charging system of FIG. 7 in accordance with an exemplary embodiment is illustrated in FIG. 8. The phase of the equivalent current $I_a$ is determined by a voltage source $V_i$ and the impedance of the base inductor 804 with value $L_B$ and the base capacitor 806 with value $C_B$. Using the current source together with the total impedance of the base inductor 804 with value $L_B$, base capacitor 806 with value $C_B$, first capacitor 810 with value $C_1$ and base system induction coil 812 with value $L_1$, the phase and magnitude of $I_1$ relative to $V_i$ can be calculated as equation (1) below:

$$I_a = V_i/(j\omega)L_B + 1/j\omega)C_B) \quad (1)$$

Figure 9:
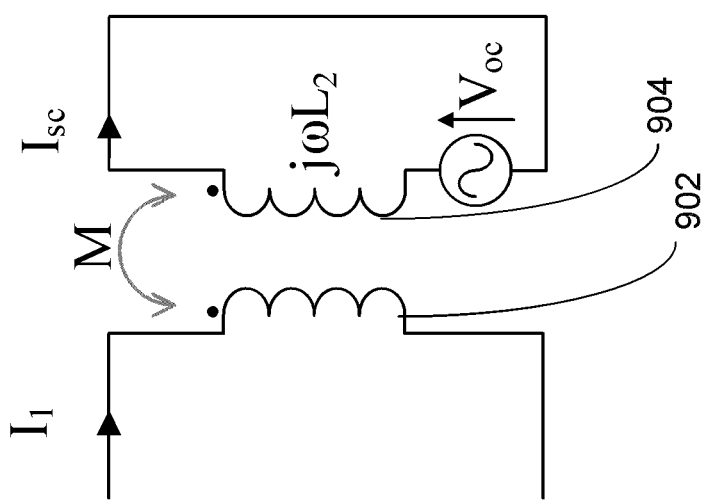
FIG. 9 is a conceptual diagram of the relationship between the base system induction coil and the electric vehicle induction coil of FIG. 7 in accordance with an exemplary embodiment.

A conceptual diagram of the relationship between the base system induction coil and the electric vehicle induction coil of FIG. 7 in accordance with an exemplary embodiment is illustrated in FIG. 9. Once the magnitude and phase of the current at the base system induction coil 902, $I_1$ is known, the induced voltage or current of the electric vehicle induction coil 904 ($V_{oc}$ and $I_{sc}$ shown in FIG. 9) can then be calculated using the following equation (2) and equation (3).

$$V_{oc} = j\omega M I_1 \quad (2)$$

$$I_{sc} = \frac{M I_1}{L_2} \quad (3)$$

As equations (2) and (3) indicate, $V_{oc}$ leads the base system induction coil current $I_1$ by 90 degrees whereas $I_{sc}$ is in-phase with $I_1$. Therefore, once the vehicle side controller has obtained the phase of $I_1$, it can then use it to compare with the measured phase of $I_{sc}$ or $V_{oc}$ in order to determine the location of the base system induction coil relative to the electric vehicle induction coil.

In particular embodiments, a base wireless power charging system can modulate an operating frequency of a current at a base system induction coil at the beginning of a negative period. A frequency change can be detected at an electric vehicle induction coil at either a full cycle or half of a cycle after modulation by a step change applied to an operating frequency of a current signal at a base system induction coil depending on the width of the step change. The change in frequency in the transmission signal can be monitored at the electric vehicle induction coil by an electric vehicle controller using both a positive and a negative period counter. A current induced in an electric vehicle induction coil can then be determined to be in phase with a current at a base system induction coil when a frequency change is first detected in the negative period counter. Similarly, a current induced in an electric vehicle induction coil can be determined to be out of phase with a current at a base system induction coil when a frequency change is first detected in the positive period counter.

Figure 10A:
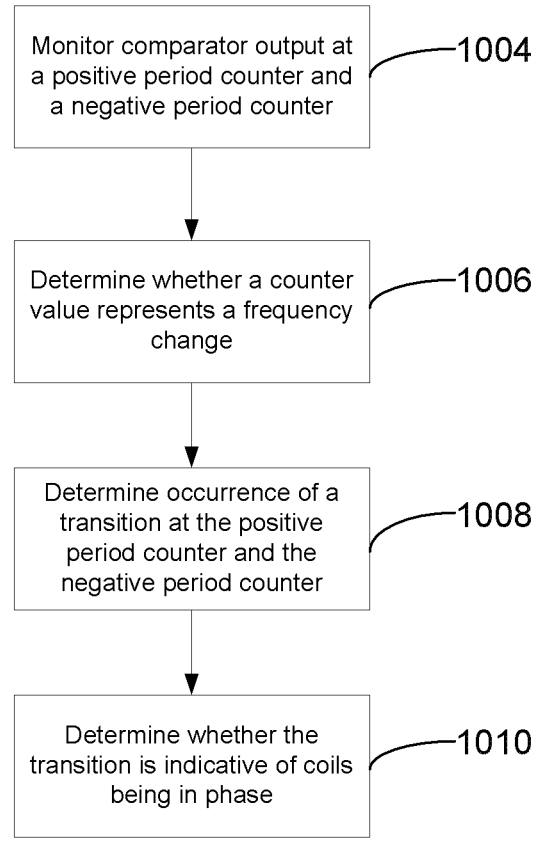
FIG. 10A is a flow chart of a process that can be performed by an electric vehicle controller, such as the electric vehicle controller of FIG. 3 for determining when an electric vehicle induction coil current is in phase with a base system induction coil current in accordance with an exemplary embodiment.

A flow chart of a process that can be performed by an electric vehicle controller, such as the electric vehicle controller 344 of FIG. 3 for determining when an electric vehicle induction coil current is in phase with a base system induction coil current in accordance with an exemplary embodiment is illustrated in FIG. 10A. As described above, the electric vehicle controller 344 may perform additional processes to determine whether a current signal at an electric vehicle induction coil with is in phase with a base system induction coil. In an embodiment, the electric vehicle controller 344 may begin at block 1004. Although the process in FIG. 10 is illustrated in a particular order, in certain embodiments the blocks herein may be performed in a different order, or omitted, and additional blocks can be added. A person of ordinary skill in the art will appreciate that the process of the illustrated embodiment may be implemented in any controller in order to determine when an electric vehicle induction coil current is in phase with a base system induction coil current.

At block 1004, the electric vehicle controller 344 monitors a positive counter and a negative counter at an output of a comparator that evaluates a current induced at an electric vehicle induction coil.

At block 1006, the electric vehicle controller 344 determines whether the counter value represents a frequency change.

At block 1008, the electric vehicle controller 344 determines an occurrence of a transition at both a positive period counter and a negative period counter.

At block 1010, the electric vehicle controller 344 determines whether the transition is indicative of a current at an electric vehicle induction coil being in phase with a current at a base system induction coil. In certain embodiments, a transition at a negative period counter that occurs prior to a positive period counter is indicative of a current at an electric vehicle induction coil being in phase with a current at a base system induction coil.

Figure 10B:
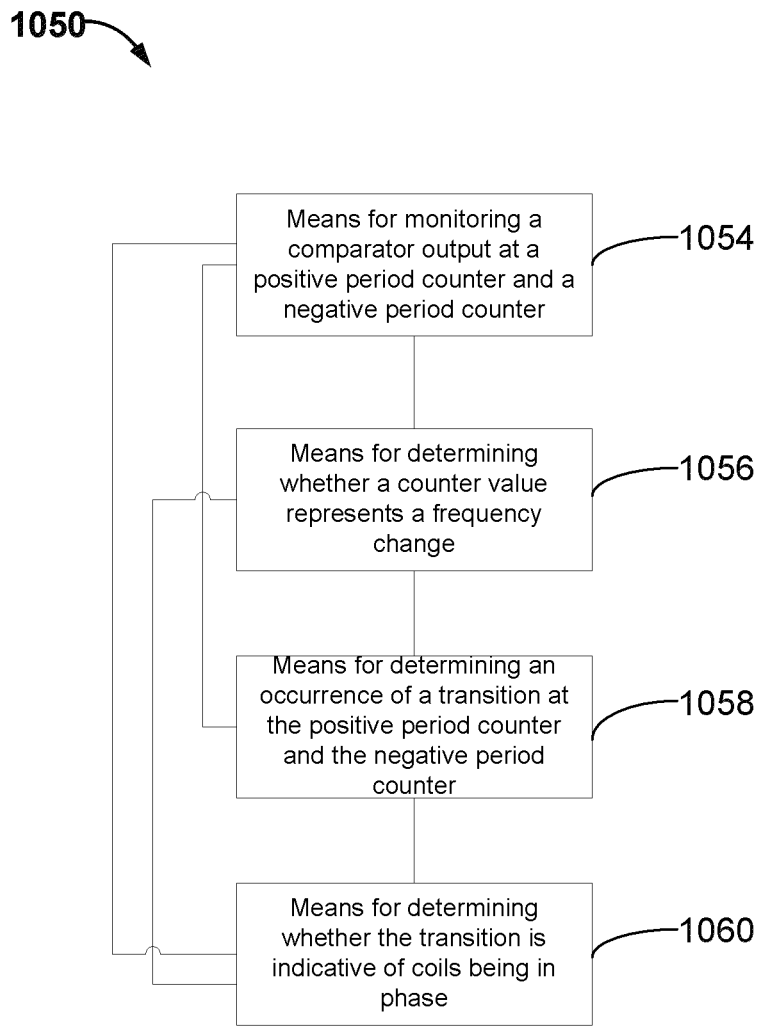
FIG. 10B is a functional block diagram of an electric vehicle charging system that can be employed to perform a process of FIG. 10A in accordance with an exemplary embodiment.

FIG. 10B is a functional block diagram of an electric vehicle charging system that can be employed to perform a process of FIG. 10A in the system of FIG. 1 in accordance with an exemplary embodiment. The electric vehicle charging system 1050 can include means 1054 for monitoring a comparator output at a positive period counter and a negative period counter. In certain embodiments, the means 1054 for monitoring a comparator output can be configured to perform one or more of the functions with respect to block 1004 (FIG. 10A). In various embodiments, the means 1054 for monitoring a comparator output comprises an electric vehicle controller 344 (FIG. 3).

The electric vehicle charging system can also include means 1056 for determining whether a counter value represents a frequency change. In certain embodiments, the means 1056 for determining whether a counter value represents a frequency change can be configured to perform one or more of the functions with respect to block 1006 (FIG. 10A). In various embodiments, the means 1056 for determining whether a counter value represents a frequency change comprises an electric vehicle controller 344 (FIG. 3).

The electric vehicle charging system can also include means 1058 for determining an occurrence of a transition at the positive period counter and the negative period counter. In certain embodiments, the means 1058 for determining an occurrence of a transition at the positive period counter and the negative period counter can be configured to perform one or more of the functions with respect to block 1008 (FIG. 10A). In various embodiments, the means 1058 for determining an occurrence of a transition at the positive period counter and the negative period counter comprises an electric vehicle controller 344 (FIG. 3).

The electric vehicle charging system can also include means 1060 for determining whether the transition is indicative of a base system induction coil current and an electric vehicle induction coil current are in phase. In certain embodiments, the means 1060 for determining whether the transition is indicative of a base system induction coil current and an electric vehicle induction coil current are in phase can be configured to perform one or more of the functions with respect to block 1010 (FIG. 10A). In various embodiments, the means 1060 for determining whether the transition is indicative of a base system induction coil current and an electric vehicle induction coil current are in phase comprises an electric vehicle controller 344 (FIG. 3).

Figure 11:
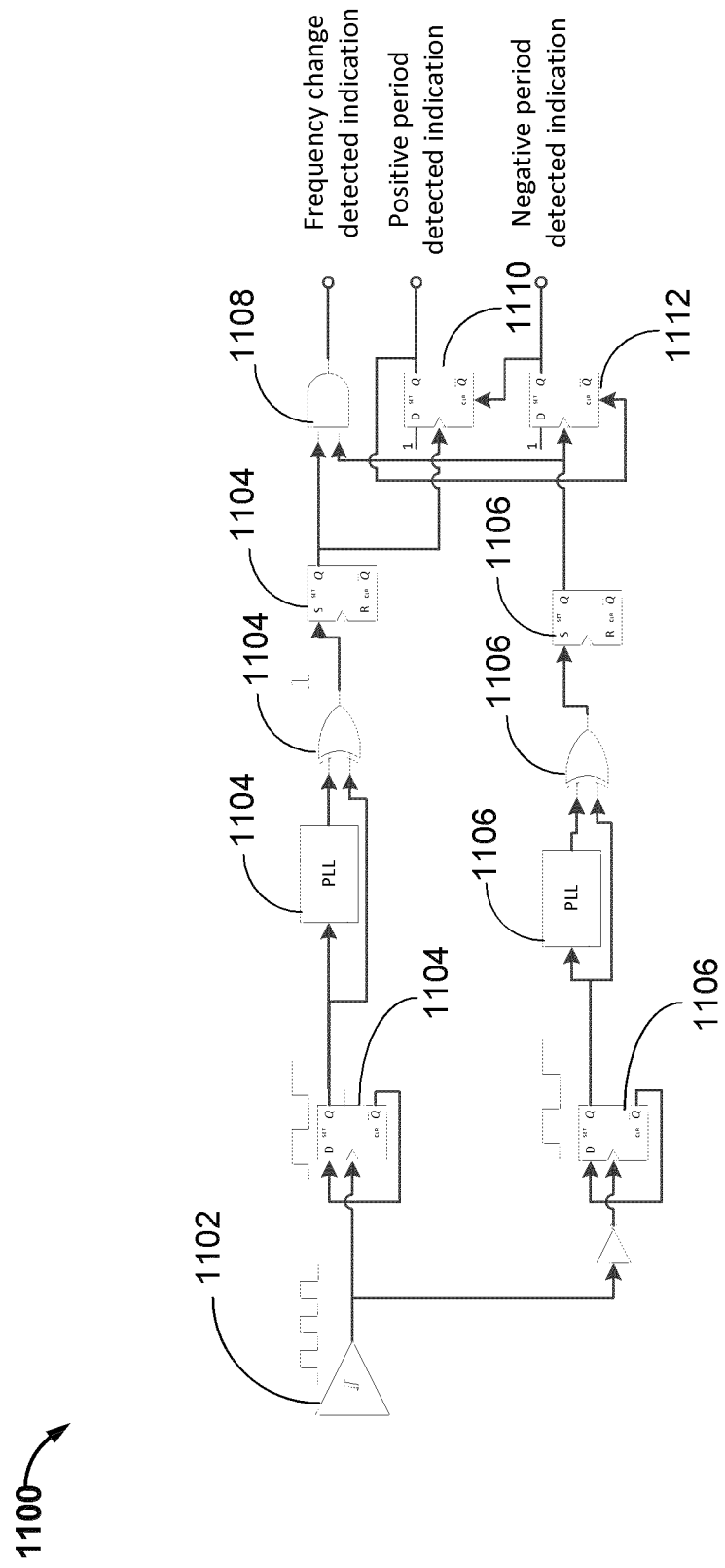
FIG. 11 illustrates a circuit diagram of circuitry that can be utilized to implement the process of FIG. 10A in accordance with an exemplary embodiment.

FIG. 11 illustrates a circuit diagram of circuitry that can be utilized to implement the process of FIG. 10A in accordance with an exemplary embodiment. The circuit diagram 1100 includes a comparator 1102 with circuitry that implements a positive period counter 1104 and circuitry that implements a negative period counter 1106 connected with the output of the comparator 1102. The circuit diagram also includes circuitry configured to determine whether a counter value represents a frequency change 1108 and circuitry configured to determine an occurrence of a transition at the positive period counter 1110 or the negative period counter 1112.

Figure 12:
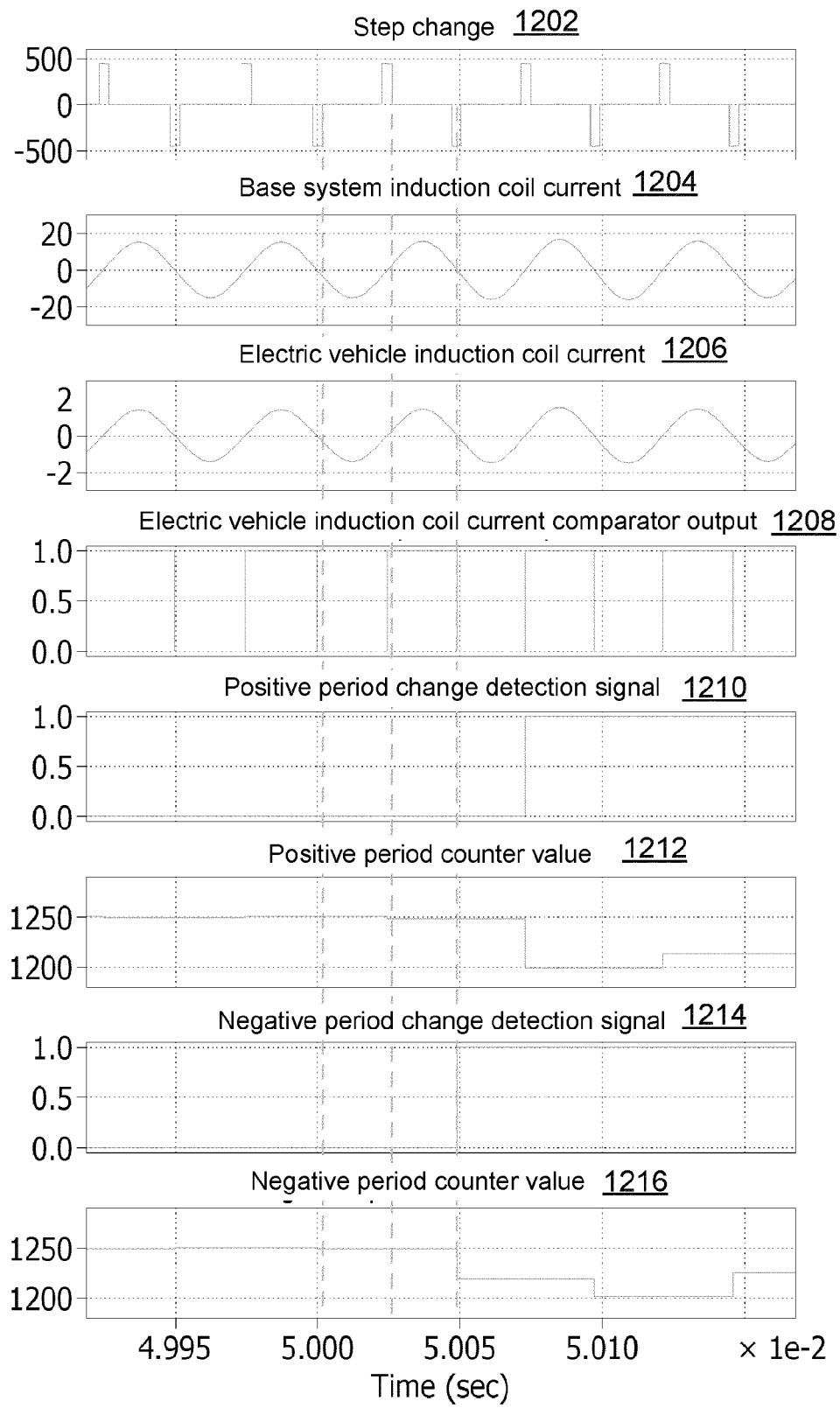
FIG. 12 illustrates various results from a simulation of a wireless power transfer system of FIG. 1 where a base system induction coil current is in phase with an electric vehicle induction coil current in accordance with an exemplary embodiment.

FIG. 12 illustrates various results from a simulation of a wireless power transfer system 100 of FIG. 1 where a base system induction coil current is in phase with an electric vehicle induction coil current in accordance with an exemplary embodiment. The simulation illustrates how a step change 1202 (such as but not limited to a step change of an inverter voltage) applied to a base system induction coil current 1204 can induce an electric vehicle induction coil current 1206. An electric vehicle induction coil current comparator output 1208 can be monitored by an electric vehicle controller using a positive period counter 1210 and a negative period counter 1216. The electric vehicle controller can determine that a base system induction coil is in phase with an electric vehicle induction coil when the negative period change detection signal 1214 transitions earlier than a positive period change detection signal 1212, indicating that a frequency change is first detected in the negative period counter.

Figure 13:
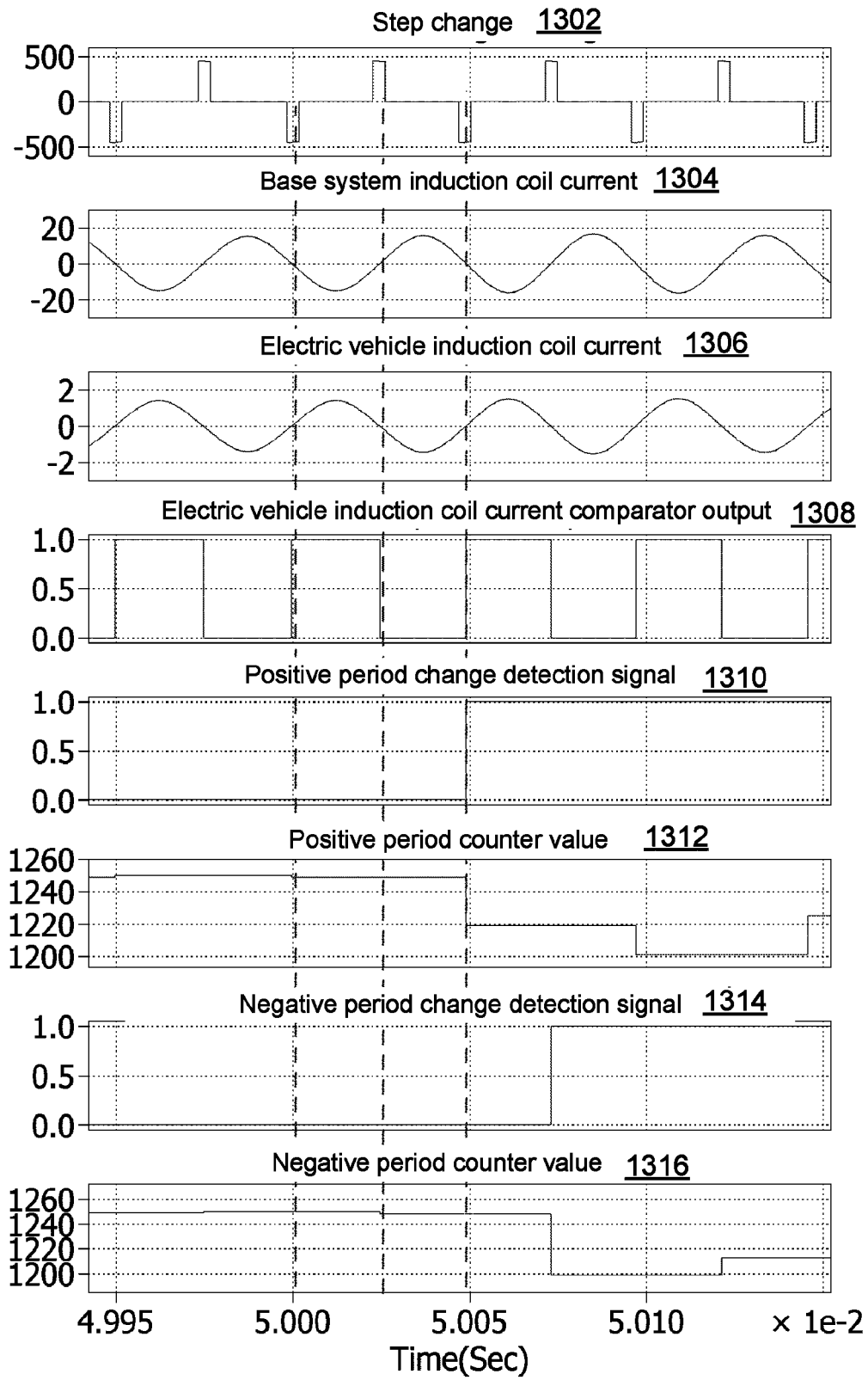
FIG. 13 illustrates various results from a simulation of a wireless power transfer system of FIG. 1 where a base system induction coil current is out of phase with an electric vehicle induction coil current in accordance with an exemplary embodiment.

FIG. 13 illustrates various results from a simulation of a wireless power transfer system 100 of FIG. 1 where a base system induction coil current is out of phase with an electric vehicle induction coil current in accordance with an exemplary embodiment. The simulation illustrates how a step change 1302 (such as but not limited to a step change of an inverter voltage) applied to a base system induction coil current 1304 can induce an electric vehicle induction coil current 1306. An electric vehicle induction coil current comparator output 1308 can be monitored by an electric vehicle controller using a positive period counter 1312 and a negative period counter 1316. The electric vehicle controller can determine that a base system induction coil is out of phase with an electric vehicle induction coil when the positive period change detection signal 1310 transitions earlier than a negative period change detection signal 1314, indicating that a frequency change is first detected in the positive period counter.

It will be understood that the appropriate circuits may be used in alternative embodiments depending on the circumstances in which the respective wireless power transfer system is expected to operate. This disclosure is not limited to any particular configuration of tuning reactive elements used in conjunction with an inductive power transfer circuit, and the parallel tuned, series tuned, and LCL tuned resonant circuits are provided herein by way of example only. Furthermore, the disclosure is not limited to any particular receiver-side means of generating a current in the receiver inductor and the voltage transformer, current transformer, and reversible rectifier techniques are discussed herein by way of example only.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As examples, some electric vehicles may be hybrid electric vehicles that include a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (for example, electronic devices such as personal computing devices and the like).

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of receiving wireless power, comprising:
   receiving, at a first coil, a wireless power transmission from a base system induction coil at a level sufficient to charge an electric device;
   detecting periodic step changes in an operating frequency of the wireless power transmission, between a first frequency and a second frequency; and
   determining a phase of a base system induction coil signal based on timing of the periodic steps.

2. The method of claim 1, wherein the first coil comprises an electric vehicle induction coil, the method further comprising
   determining a location of the electric vehicle induction coil relative to the base system induction coil by comparing a base system induction coil current phase with a current phase of the electric vehicle induction coil.

3. The method of claim 1, wherein the first coil comprises an electric vehicle induction coil, the method further comprising determining a location of the electric vehicle induction coil relative to the base system induction coil by comparing a base system induction coil current phase with a voltage phase of the electric vehicle induction coil.

4. The method of claim 1, wherein the first coil comprises an electric vehicle induction coil, the method further comprising determining a location of the electric vehicle induction coil relative to the base system induction coil by comparing a base system induction coil voltage phase with a voltage phase of the electric vehicle induction coil.

5. The method of claim 1, wherein the first coil comprises an electric vehicle induction coil, the method further comprising determining a location of the electric vehicle induction coil relative to the base system induction coil by comparing a base system induction coil voltage phase with a current phase of the electric vehicle induction coil.

6. The method of claim 1, further comprising comparing, at a comparator, a base system induction coil current phase with a current phase of first coil.

7. The method of claim 6, further comprising, monitoring a positive counter and a negative counter at an output of the comparator.

8. The method of claim 7, further comprising determining, during a transition at both the positive period counter and the negative period counter, whether the transition is indicative of a current at the first coil being in phase with a current at the base system induction coil.

9. The method of claim 8, wherein:
the identifying a phase of the base system induction coil signal is performed using an electric vehicle controller coupled with the electric vehicle induction coil.

10. The method of claim 1, wherein the second frequency is greater than the first frequency.

11. The method of claim 1, wherein the second frequency is less than the first frequency.

12. The method of claim 1, wherein the wireless power transmission is at a level sufficient to charge an electric vehicle.

13. A wireless power receiver, comprising:
an electric vehicle induction coil configured to receive a wireless power transmission for charging an electric vehicle;
a detector configured to detect periodic step changes in an operating frequency of the wireless power transmission, between a first frequency and a second frequency; and
an electric vehicle controller configured to determine a phase of a base system induction coil signal based on timing of the periodic steps.

14. The wireless power receiver of claim 13, wherein the electric vehicle controller is configured to determine a location of the electric vehicle induction coil relative to a base system induction coil that transmits the transmission signal by comparing an electric vehicle induction coil current signal phase with the determined phase of the base system induction coil current signal.

15. The wireless power receiver of claim 13, wherein the electric vehicle controller is configured to determine a location of the electric vehicle induction coil relative to a base system induction coil that transmits the transmission signal by comparing an electric vehicle induction coil voltage signal phase with the determined phase of the base system induction coil current signal.

16. The wireless power receiver of claim 13, the electric vehicle controller is configured to determine a location of the electric vehicle induction coil relative to a base system induction coil that transmits the transmission signal by comparing an electric vehicle induction coil voltage signal phase with the determined phase of the base system induction coil voltage signal.

17. The wireless power receiver of claim 13, wherein the electric vehicle controller is configured to determine a location of the electric vehicle induction coil relative to a base system induction coil that transmits the transmission signal by comparing an electric vehicle induction coil current signal phase with the determined phase of the base system induction coil voltage signal.

18. The wireless power receiver of claim 13, further comprising a comparator configure to compare a base system induction coil current phase with a current phase of the electric vehicle induction coil.

19. The wireless power receiver of claim 18, further comprising a positive counter and a negative counter at an output of the comparator.

20. The wireless power receiver of claim 19, wherein the electric vehicle controller is configured to determine, during a transition at both the positive period counter and the negative period counter, whether the transition is indicative of a current at the first coil being in phase with a current at the base system induction coil.

21. The wireless power receiver of claim 13, wherein the second frequency is greater than the first frequency.

22. The wireless power receiver of claim 13, wherein the second frequency is less than the first frequency.

23. The wireless power receiver of claim 13, wherein the wireless power transmission is at a level sufficient to charge an electric vehicle.

24. A method of transmitting wireless power, comprising:
generating a wireless power transmission signal, for transmission by a base system induction coil to a wireless power receiver, by periodically stepping an operating frequency of the wireless power transmission between a first frequency and a second frequency to indicate a phase of the base system induction coil; and
transmitting, at the base system induction coil, the wireless power transmission signal.

25. The method of claim 24, wherein the periodic stepping is generated via a step change applied to an inverter voltage operating.

26. The method of claim 24, wherein a location of an electric vehicle induction coil relative to the base system induction coil is determinable by comparing the phase of the base system induction coil signal with a phase of an electric vehicle induction coil of the wireless power receiver.

27. A wireless power transmitter, comprising:
a base system transmit circuit configured to generate a wireless power transmission signal, for transmission by a base system induction coil to a wireless power receiver, by periodically stepping an operating frequency of the wireless power transmission between a first frequency and a second frequency to indicate a phase of the base system induction coil; and
a base system induction coil configured to transmit the wireless power transmission signal.

28. The transmitter of claim 27, wherein the periodic stepping is generated via a step change applied to an inverter voltage.

29. The transmitter of claim 27, wherein a location of an electric vehicle induction coil relative to the base system induction coil is determinable by comparing the phase of the base system induction coil signal with a phase of an electric vehicle induction coil of the wireless power receiver.

* * * * *